Figure 1:
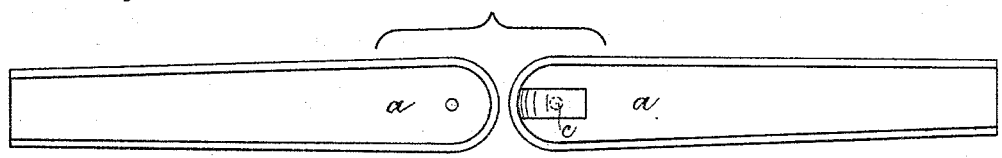

(No Model.) 2 Sheets—Sheet 1.

W. W. LEE.
HOLLOW HANDLE FOR IMPLEMENTS.

No. 412,277. Patented Oct. 8, 1889.

(No Model.) 2 Sheets—Sheet 2.

W. W. LEE.
HOLLOW HANDLE FOR IMPLEMENTS.

No. 412,277. Patented Oct. 8, 1889.

UNITED STATES PATENT OFFICE.

WILLIAM WILSON LEE, OF NORTHAMPTON, MASSACHUSETTS.

HOLLOW HANDLE FOR IMPLEMENTS.

SPECIFICATION forming part of Letters Patent No. 412,277, dated October 8, 1889.

Application filed February 23, 1889. Serial No. 300,827. (No model.)

*To all whom it may concern:*

Be it known that I, WILLIAM WILSON LEE, of Northampton, in the county of Hampshire and State of Massachusetts, have invented an Improved Blank for Making Implements with Hollow Handles, of which the following is a specification, reference being had to the accompanying drawings, which are described below and which illustrate my invention.

My invention relates to implements which consist, as heretofore made, of three pieces welded together to form a single piece, these pieces being two shells $a\ a$ and a stub-piece $b$, which are welded together to form what is substantially, when welded, a single piece, each shell being welded to the other and both being welded to the stub-piece.

While it has been common before my invention to make hollow-handled knives and forks by brazing or soldering two shells together and to the tang of the knife or fork, such shells have never, so far as I am aware, been practically used in the manufacture of these implements by welding; but the hollow handle has heretofore always been formed of a single piece of metal in the form of a tube, except as shown in my prior patent, No. 363,401 dated May 24, 1887, where the shells are held together by a projection from one entering a cavity in the other.

It will be clear that a variety of styles of hollow handles may be readily made when two shells are used which cannot be made practically when a single piece of metal in the form of a tube is used, and it has long been desirable to make implements whose handles are composed of two shells welded together and to a stub; but heretofore the practical difficulties in securing the two shells each to the other and both to the stub have been such as to prevent the manufacture of this class of implements to any large extent.

The main object of my invention is to make practical the use of two shells and a stub in the manufacture of welded hollow-handled implements; and my invention consists in a blank composed of a stub and two shells and a binder which firmly unites the shells together and to the stub, the shells being also held edge to edge, so that the blank can be readily handled in applying the flux in heating to a welding heat and in the drop-forging process. Part of these objects are fairly well attained by the means described in my prior patent, No. 363,401; but the shells there shown are expensive to make, and the blank formed as described in that patent is imperfect, because the shells are not held firmly enough to the stub.

My new blank differs in two respects from those heretofore known, for it consists in at least four parts, instead of three, as heretofore, viz: two shells $a\ a$, the stub $b$, and the binder $c$, the binder serving not only to hold the shells $a\ a$ together and in proper relation one with the other, but also to hold them so that they firmly clamp the stub $b$; for as above explained, my invention is a blank in which the two shells and the stub are so firmly held together by a binder that the blank can be handled in all the after steps of the process of making welded hollow-handled implements without practical danger of the parts becoming disconnected or getting out of place.

The most convenient form of blank depends largely upon the style of handle to be formed.

Figure 2:
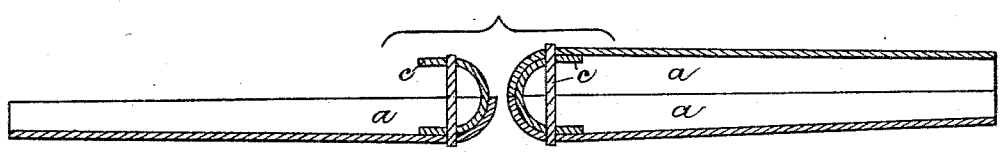
Figure 3:
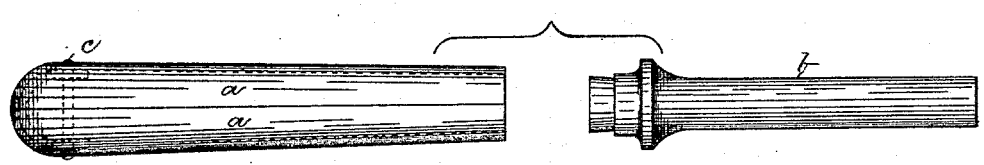
Figure 4:
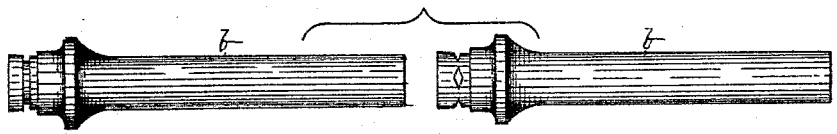
Figure 5:
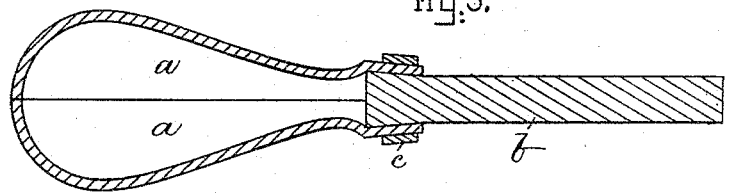

Figures 1, 2, 3, and 4 show the details of a blank which I prefer in the manufacture of knives and forks whose hollow handles are of the ordinary style, Fig. 1 being a plan view of two shells $a\ a$ and binder $c$, Fig. 2 being a section showing on the left a section of one of the shells $a$, with the binder $c$ in place, and on the right a section of the two shells put together, with the binder in place ready to receive the stub. Fig. 3 is an elevation of the and two shells secured together by the binder showing one form of stub. Fig. 4 shows two modifications of the form of stub. Fig. 5 is a sectional elevation illustrating the blank preferred in making hollow-handled implements, such as screw-drivers and other tools requiring a handle whose area in cross-section at one place differs greatly from its area in cross-section at another place, and where the binder $c$ may be shaped to form an ornamental rib, as shown in Fig. 6, which is an elevation of the finished implement.

In the practical manufacture of my blanks the two pieces from which the shells $a\ a$ are formed are made from sheet metal—preferably soft iron—and are then struck up into form, the hole being made near the butt of each, as shown in Figs. 1, 2, and 3, to receive the binder $c$, which in those figures is shown as a rivet with a re-enforcing strip of metal. After the parts shown in Figs. 1, 2, and 3 are assembled they are compressed between suitable dies, which upsets the end of the rivet, and also forces the ends of the shell closely upon the end of the stub $b$, thereby completing the blank and practically joining the four pieces, so that they can be handled for all practical purposes as if they were one single piece. I prefer to make that end of the stub-piece $b$ which enters between the shells conical, as in Fig. 3, although it may be grooved or notched, as in Fig. 4, as will be obvious.

Figure 6:
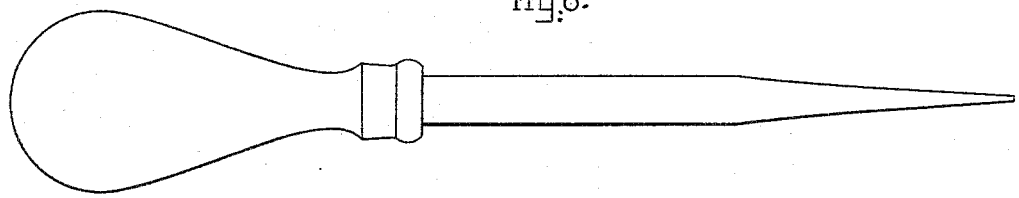

In making blanks of the style shown in Fig. 5 for handles of the style shown in Fig. 6 I prefer to use the binder $c$ in the form of a ring or short tube of metal, which can be forced on, as in Fig. 5. This ring-binder $c$ may fit loosely when first put in place, and then be upset by compression between dies, so as to bind the shells $a\ a$ to the stub $b$, and to hold the parts in proper relation each to the others.

Figure 7:
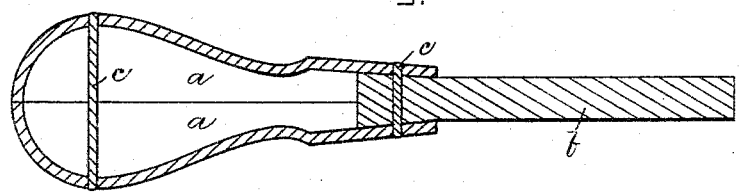

Fig. 7 illustrates one form of my blank where two binders are used, the additional binder $c$ passing through both shells and the stub $b$.

What I claim is—

The improved blank for hollow-handled implements above described, consisting of the two shells $a\ a$, stub $b$, and binder $c$ united together, substantially as set forth.

WILLIAM WILSON LEE.

Witnesses:
C. H. PIERCE,
W. M. COCHRAN.